United States Patent [19]

Stone

[11] Patent Number: 5,006,569

[45] Date of Patent: Apr. 9, 1991

[54] DENSITY REDUCTION IN FLEXIBLE POLYURETHANE FOAMS

[75] Inventor: Herman Stone, Hazleton, Pa.

[73] Assignee: PMC, Inc., Sun Valley, Calif.

[21] Appl. No.: 394,548

[22] Filed: Aug. 16, 1989

[51] Int. Cl.$^5$ ............................................. C08G 18/14
[52] U.S. Cl. ..................................... 521/118; 521/128
[58] Field of Search ................................. 521/118, 128

[56] References Cited

U.S. PATENT DOCUMENTS

| | | | |
|---|---|---|---|
| 4,284,728 | 7/1981 | Demos et al. | 521/155 |
| 4,500,656 | 4/1985 | Rasshofer et al. | 521/164 |
| 4,735,970 | 6/1988 | Sommerfield et al. | 521/128 |
| 4,876,292 | 10/1989 | Milliren | 521/159 |

FOREIGN PATENT DOCUMENTS 0145250  6/1985  European Pat. Off. .

*Primary Examiner*—Maurice J. Welsh
*Attorney, Agent, or Firm*—Davis Hoxie Faithfull & Hapgood

[57] ABSTRACT

Improved, flexible, open-celled polyurethane foams of reduced density, but with stability and firmness characteristics comparable to those of standard foams, are described. The foams are formed in situ from the reaction, in the presence of a catalyst, of an isocyanate, one or more blowing agents including water, a foam stabilizer, a polyether polyol, and a liquid salt produced from the reaction of $CO_2$ with a water-soluble amine or amino alcohol. Preferred amines or amino alcohols for the $CO_2$ salt include primary amines and polyols which contain primary amino end groups, secondary amines which contain primary hydroxyl groups, and a variety of low molecular weight aminohydroxy compounds. The liquid salt is present in the foam formulations in an amount of at least 2 parts by weight per 100 parts by weight of polyol.

42 Claims, No Drawings

DENSITY REDUCTION IN FLEXIBLE POLYURETHANE FOAMS

BACKGROUND OF THE INVENTION

1. Field of the Invention

This invention relates to flexible, open-celled, free-rise polyurethane ("PU") foams made by molding or by continuous casting methods. In accordance with the present invention, carbon dioxide—from sources other than the reaction of water and free isocyanate—is present in the gaseous state during the foam-forming reaction. The carbon dioxide contributes to the rise of the foam and to the lowering of density of the foam product.

2. Description of Related Art

Flexible PU foams, of both the conventional and high resilient types, are produced from formulations typically containing an isocyanate reactant, one or more blowing agents including water, a foam stabilizer, catalysts, and polyether polyols. High resilient ("HR") foams are those which exhibit a rapid recovery from extreme compression. As compared with conventional foams, HR foams exhibit a higher resilience (55% to 65% for HR, compared with 40% to 55% for conventional) and a higher modulus (2.2 to 2.7 for HR, compared with 1.8 to 2.3 for conventional), where the modulus is defined as the ratio of the 65% Indentation Force Deflection ("IFD") measurement to the 25% IFD measurement.

PU foams are formed by the effervescent action of a gas on the product of a polymerization reaction. Specifically, isocyanate groups react with water to generate carbon dioxide gas. This gas is dispersed and, to a large extent, retained during the subsequent polymerization—which involves the reaction of additional isocyanate with hydroxyl groups of the polyols. At the time the polymerization is essentially complete, the foam gels (i.e., becomes solid) and the cells are usually broken open by the heat of reaction and the pressure of trapped gases to produce the well-known open cell structure of flexible PU foams.

The suitability of a particular PU foam for any given end use is determined primarily by two critical physical properties: its density and its firmness.

The density of a foam is principally controlled by adjusting the proportion of water in the formulation, which in turn regulates $CO_2$ generation or "blowing". However, it is well-known that the reaction of water with isocyanate not only yields $CO_2$ but also produces urea linkages in the polymer which make the foam firmer, less elastic, and more brittle. The use of water as a blowing agent thus does not permit the variation of density independently of other properties. Moreover, the reaction of water with isocyanate is highly exothermic. The heat generated can cause undesirable effects ranging from internal degradation, e.g., scorch, to decomposition and even combustion of the foam during the curing phase of the reaction. Therefore, the maximum amount of water which can be used is limited by safety considerations as well as by the foam properties desired.

For years the problems associated with controlling density by addition of water have been circumvented by including in the formulations certain low-boiling, nonreactive liquids, e.g., methylene chloride or chlorofluorocarbons. These auxiliary blowing agents are converted to gases by the heat of the polymerization reactions. Since these gases are not incorporated into the polymer structure, they do not cause firming or embrittlement. Auxiliary blowing agents thus have enabled the lowering of density without an increase in firmness, resulting in soft, stable, resilient foams. However, the use of these agents is now seen as undesirable, due to concern about the health effects of exposure to methylene chloride vapors and due to concern about adverse environmental effects, specifically, depletion of the atmospheric ozone layer which may result from the release of chlorofluorocarbons into the atmosphere.

Various methods have been suggested in the art to eliminate or reduce the need for commercial auxiliary blowing agents. One such alternative proposes the use of carbon monoxide produced by the decomposition of formic acid as an auxiliary blowing agent. This method has not found acceptance because formic acid is highly corrosive and because the gaseous degradation product, carbon monoxide, is both highly toxic and flammable.

Another known method for lowering foam density involves pouring foam into molds or like containers, which are placed in a sealed chamber. Reduction of atmospheric pressure within the chamber during the rise of the foam produces a finished product of reduced density without the addition of gas-producing constituents. But such treatment is difficult to control and is not applicable to the majority of commercial manufacturing facilities, which produce continuous buns or blocks of flexible PU foam.

It has also been found that the presence of air and other dissolved gases in the foam-forming ingredients, before or during mixing, results in the formation of bubbles and unacceptable holes in the cured foam product. Technology does exist for producing stable emulsions of gases, including air, in rising foam. But this frothing method, in its present commercial form, requires the use of pressurized foaming equipment and is not suitable for the preparation of low density and/or soft foams.

Carbon dioxide is considered to be a desirable auxiliary blowing agent. When added to foam formulations, it does not react to produce urea structures or heat. Moreover, $CO_2$ would not pose any problems of flammability and would decrease the level of toxic or possibly harmful effluents in the plant and atmosphere. But the simple addition of carbon dioxide in gaseous form at the mixing head is not effective. No measurable effect on either density or firmness is achieved.

Other methods have been proposed for introducing $CO_2$ into the foam-forming reactants. U.S. Pat. No. 4,906,672 discloses a process for incorporating $CO_2$ into the feed stream of one or more of the liquid reactant constituents of the foam formulation. Specifically, gaseous $CO_2$ is injected under pressure into a feed stream at a distance from the mixer which will maximize the dissolution of $CO_2$ in the feed stream. The gas is then held sufficiently strongly in solution so as not to be released until such time as it can be retained in the expanding reactant mass and can contribute to the cell structure of the final, stabilized foam product. The effect on the foam is a reduction of density with only a slight decrease in the firmness or load-bearing ability of the foam.

In U S. Pat. 4,284,728, the addition of carbon dioxide is proposed as a stabilizer, i.e., to reduce the reactivity of reactive amines used as cross-linking agents in the foam-forming reaction to produce HR foams. A blend of polyol and diamine cross-linking agent is treated with $CO_2$, as by sparging, up to a concentration of 2.0 moles of $CO_2$ per equivalent of cross-linking agent. But HR foams obtained using the $CO_2$ treatment exhibit a higher density, rather than a lower density, than those made without $CO_2$ treatment under comparable conditions.

EPO 145,250 suggests that adducts of $CO_2$ can be prepared for use as additional blowing agents in PU foam manufacture. One such $CO_2$ adduct is a salt produced from the reaction of $CO_2$ with a water-soluble amine, in the presence of water and polyol. The adduct is then destabilized by reacting with tolylene diisocyanate ("TDI"), thereby releasing the $CO_2$ as a gas in the foam-forming reaction mixture. This method, as disclosed, is limited to the mixing and dissolution of solid and gaseous $CO_2$ in a pressurized vessel in a polyol that also contains water, trichlorofluoromethane, silicone, tin catalyst and an amine accelerator.

While the method of EPO 145,250 appears to permit the 10 reduction of water and isocyanate in the foam-forming reaction, the quality of the final foam product is not fully disclosed. (In one example, foam shrinkage was reported.) Moreover, it is common industrial practice to switch from production of one foam grade to another "on the fly", i.e., without interrupting the flow of materials to the mixing head. The EPO 145,250 method of incorporating the $CO_2$ by dissolution in the polyol component —which also contains all of the other "low molecular weight fluids" that comprise the formulation—could therefore be impracticable under commercial operating conditions.

The use of a $CO_2$ adduct is also disclosed in U.S. Pat. No. 4,735,970 in the preparation of rigid foams by the frothing process. The adduct is formed by the reaction of $CO_2$ with specified amines containing at least one secondary amino group, no primary amino groups, and at least one primary or secondary hydroxyl group, provided there are not more primary hydroxyl groups than amino groups. The adduct optionally contains water. Although it is stated that the adduct can be employed in the manufacture of flexible and semi-rigid foams by block foaming and by the laminator process, no examples are provided other than frothing of rigid foams.

Finally, U.S. Pat. No. 4,500,656 discloses methods for making stable liquid $CO_2$ adducts of low molecular weight amines and amino alcohols such as diethanolamine (DEOA), preferably in the presence of some water. Although the disclosure ostensibly is for the general use of these adducts in PU foams, the discussion and examples—based on the hydroxyl numbers of the polyols utilized—are directed only to rigid and semi-rigid foams, and to the frothing process. There are no examples of utility or benefits in the context of flexible PU foams.

The failure of U.S. Pat. No. 4,500,656 to address flexible PU foams is not surprising. Liquid $CO_2$: amine salts (e.g., $DEOA:CO_2$) would have to be present in foam formulations in concentrations greater than 2 phr (parts by weight per hundred parts by weight of polyol) in order to bring about measurable density reductions in the final foam product. DEOA and similar materials have been used in some types of HR flexible foams -but only at very low concentrations, i.e., up to 2 phr. It is well-known in HR foam technology that greater concentrations of DEOA cause undesirable softening of foams. This softening can be mitigated by a number of modifications known to those familiar with the art, such as changing the polyols in the foam formulation, adding crosslinkers, increasing the TDI index, increasing the functionality of the isocyanate, or blending MDI (methylene diparaphenylene diisocyanate) with TDI. However, such remedies work only within relatively narrow limits. Moreover, DEOA, when present during the foaming reaction at levels higher than 2 phr, generally leads to instability which cannot be overcome by conventional means, i.e., by increasing catalyst levels. This has been a problem particularly in the production of lower density HR foams.

SUMMARY OF THE INVENTION

The present invention provides new formulations for use in the manufacture of flexible PU foam products of reduced density. Density is reduced by 10% or more, in both HR and conventional flexible foams, without the use of additional water-isocyanate reactions or auxiliary blowing agents which may be toxic or detrimental to the environment.

The invention incorporates a well-known principle which heretofore has not been applied in the production of flexible PU foams. Carbon dioxide, being a weak acid, can form stable salts with bases—even relatively weak organic bases such as amines. Suitable amines or amino alcohols for this purpose include primary amines and polyols which contain primary amino end groups, secondary amines which contain primary hydroxyl groups, and a variety of low molecular weight aminohydroxy compounds. The amine:$CO_2$ salts will react with TDI and other isocyanates, resulting in liberation of the complexed $CO_2$ gas. The presence of this gas during the foam-forming reaction contributes to the lowering of density of the foam product. The release of the complexed $CO_2$ occurs later in the process than would the release of $CO_2$ which is merely compressed in the liquid reactants. This later release results in more efficient utilization of the gas.

Formulations of the invention contain amines at concentrations of greater than 2 phr, and unexpectedly produce stable flexible PU foams. It has been further discovered that amine:$CO_2$ salts can be substituted for the amines, resulting in a significant decrease in density with no adverse effect on either firmness or stability. Although the amines themselves may contribute to lower density by virtue of their high reactivity, the amine:$CO_2$ salts, because of their lower or delayed catalytic activity, provide better processability.

DETAILED DESCRIPTION OF THE INVENTION

The invention relates to flexible PU foams of reduced density and to a method for making such foams. The lower density foams of the invention exhibit improved compression set and cell structure over comparable, higher density foams, and are free of holes caused by undesirable dissolved gases.

Formulations of the invention incorporate amine:$CO_2$ salts. The salts are produced by bubbling $CO_2$ into the amine, or into an aqueous solution of the amine, at pressures ranging from atmospheric to about 80 pounds per square inch ("psi"), until saturation occurs. Aqueous amine solutions are preferred starting materials because of their lower viscosity and greater storage-stability as compared with anhydrous amines. Optimally, the aqueous amine solutions contain as little water as is necessary to impart suitably low viscosity and high stability. Because it is desirable not to increase the overall content of water in the foam formulation, the amount of water added as a blowing agent should be decreased to compensate for the amount of water added via the aqueous amine solution.

Preferred amines for the amine:$CO_2$ salts include primary amines and polyols which contain primary amino end groups, secondary amines which contain primary hydroxyl groups, and a variety of low molecular weight aminohydroxy compounds. In general, the amount of $CO_2$ which reacts with an amine decreases with decreasing basicity of the amine. Theoretically one mole of $CO_2$ should react with one equivalent of amine, but in practice greater amounts of amine are required. For secondary amines, which are relatively less basic than primary amines, as many as two equivalents of amine may be required for each mole of $CO_2$. Aromatic amines, as well as tertiary aliphatic amines, have been found to be insufficiently basic to produce stable $CO_2$ salts.

Among the secondary amines of the invention, especially preferred are amino alcohols which contain secondary amino groups and primary hydroxyl groups, provided there are at least as many hydroxyl groups as amino groups. DEOA, which is typical of such compounds, has been found particularly useful in the production of HR flexible foams.

Either anhydrous DEOA or aqueous solutions are suitable starting materials for the reaction with $CO_2$ which produces the DEOA:$CO_2$ salt. In the preferred form of invention, the amount of water is to be limited. Especially preferred is a starting material consisting of 85% DEOA and 15% water, which corresponds approximately to the monohydrate of DEOA. This material is commercially available as Niax catalyst DEOA-LF, sold by Union Carbide Corp. The resulting stable adduct of $CO_2$ takes the form of a complex with approximately the following composition: 2DEOA:$2H_2O$1-$CO_2$ (i.e., 72.4% DEOA, 12.4% $H_2O$, and 15.2% $CO_2$ by weight).

In order to bring about a measurable decrease in the density of a foam product via the reaction of the $CO_2$ adduct with TDI and the consequent liberation of gaseous $CO_2$, the $CO_2$ salts of secondary amines should be present in foam formulations at a concentration of at least 2 phr. Preferably, the concentration should be at least 4 phr.

Among the primary amines of the invention, especially preferred are polyether polyols in which substantially all of the hydroxyl groups have been converted to amino groups. Such compounds are commercially available as "Jeffamines", sold by Texaco. The lower the effective equivalent weight of amine used, the more $CO_2$ that can be introduced into the foam formulation per weight of amine. Of the various Jeffamines tested, D-230, a 230-molecular-weight difunctional product, and EDR 148, a more reactive, 148-molecular-weight difunctional product, have been found to be especially effective. These amines not only form salts with relatively large proportions of $CO_2$, but also do not contribute to excessive cross-linking in the foam-forming reaction. Aqueous solutions of these Jeffamine:$CO_2$ salts have proven particularly effective at reducing foam densities.

The $CO_2$ salts of primary amines should be present in foam formulations at a concentration of at least 3 phr in order to bring about measurable decreases in density. Preferably, the concentration should be at least 6 phr.

The low molecular weight aminohydroxy compounds of the invention preferably contain from 4 to 6 carbons. Especially preferred are tris(hydroxymethyl)aminomethane, commercially available as "TrisAmino", and 2-amino-2-methyl-l-propanol, commercially available as a 95% solution designated "AMP-95", both sold by Angus Chemical Company. To bring about measurable decreases in density, $CO_2$ salts of these aminohydroxy compounds should be present in foam formulations at a concentration of at least 3 phr. Preferably, the concentration should be at least 6 phr. A mixture of such low molecular weight aminohydroxy:$CO_2$ salts can be employed.

The conventional polyether polyol reactants useful in the invention are those known to those skilled in the art to be suitable in the production of PU foams. The polyether polyol has a molecular weight of about 2000 to about 6500, and preferably from about 2700 to about 3900, with a hydroxyl functionality of about 2 to about 8, and preferably about 2 to about 3. Suitable polyether polyols can be prepared by the addition of an excess of alkylene oxides, such as propylene oxide ("PO") and/or ethylene oxide ("EO"), to glycerine, trimethylolpropane, pentaerythritol, alphamethylglucoside, sorbitol or sucrose, for example. Most preferred are polyether polyols of glycerine, PO and EO, and those modified by copolymerizing with styrene or mixtures of styrene and acrylonitrile. The latter are commonly referred to as "polymer polyols" or "graft polyols".

The isocyanate reactant used in the invention is also a conventional material in the art of PU foam production. Preferably, TDI is employed and, as used, is one of the conventional mixtures of the 2,4- and 2,6-isomers, ranging from about 65 to about 80% of the 2,4-isomer, preferably about 80%. However, other polyisocyanates having on average two isocyanate groups per aromatic ring are suitable. Examples of such compounds are phenylene diisocyanate, naphthalene diisocyanate, diphenyl-4,4,-diisocyanate, xylene diisocyanate, polymeric methylene diparaphenylene isocyanate (MDI), and the like. Polyisocyanate must be added in an amount sufficient to react with all of the amines in the foam formulation. The amount of polyisocyanate normally added (i.e., the polyisocyanate "index") is about 102% to about 110% of the amount required to react stoichiometrically with the reactive groups in the formulation, which reactive groups comprise primarily the hydroxyl groups of the polyols and the water.

Conventional blowing agents and catalysts are also used in the present invention. Water is the preferred blowing agent, but can be supplemented by volatile organic blowing agents. Water can be present in an amount from about 2 to about 6 parts by weight per 100 parts by weight of total polyol present. Preferably, water is present in amounts of about 3 to about 5 parts per 100 parts of polyol.

Salts of organic acids or organometallic compounds are usually used to catalyze the reaction. Organic tin compounds are normally used; useful catalysts include salts of carboxylic acids such as tin (II) acetate, tin (II) octoate, tin (II) ethylhexoate, tin (II) laurate and dialkyl tin salts such as dibutyl tin diacetate, dibutyl tin dilaurate, dibutyl tin maleate and dioctyl tin diacetate. The organic metal catalyst is normally added in amounts of from about 0.05 to about 1.0 parts by weight per 100 parts by weight of total polyol present. Preferably it is present in amounts of about 0.05 to about 0.5 parts. The preferred catalyst is stannous octoate.

Tertiary aliphatic amines are also conventional and are used as co-catalysts in the production of the PU foams of the invention. Useful compounds include, for example, triethylenediamine, N-ethylmorpholine, N,N,N,,N,-tetramethyl-1,3butanediamine, bis 2-(N,N-dimethylamino) ethyl ether, diethylenetriamine, oxybis (N,N,-diethanolamine) and other similar compounds. Such compounds normally are added in amounts of from about 0.1 to about 0.6 parts by weight per 100 parts by weight of total polyol present. Preferably, they are present in amounts of about 0.2 to 0.4 parts. Preferred are mixtures of diethylenetriamine and oxybis (N,N,-diethanolamine).

Conventional PU foam stabilizers can also be and preferably are included in the reaction mixture of the present invention. Useful stabilizers include those well-known to the art, e.g., polyalkylene oxide dimethyl siloxane copolymers. Two preferred stabilizers, designated L-560 and L-5307 respectively, are commercially available from Union Carbide Corporation. The stabilizers are conventionally added in amounts of from about 0.7 to about 6 parts by weight per 100 parts by weight of total polyol present. Preferably, in the present invention they are present in amounts of from about 1 to about 2 parts.

Other optional ingredients which can be added to the formulations of the invention include discoloration and aging inhibitors, flame retardants, pigments, such as carbon black, colorants, and the like.

Production of the PU foams of the invention can be achieved by use of conventional foam-making machinery operated in a manner known to those skilled in the art. The foams can be made either by molding or by casting processes. In the latter, reactants and additives are mixed together and deposited on a moving casting conveyor in a conventional manner where the foam rises and reaches a self-sustaining configuration, after which it can be cut and otherwise handled.

The formulations of the invention can also be used in conjunction with other means of introducing additional $CO_2$ gas into the foaming reaction, e.g., the process disclosed in copending U.S. Ser. No. 226,145.

Tables 1 through 10 illustrate the invention, but are not inclusive of the full scope of the invention. Ingredients and entries in those tables are here described:

Polyols

Multranol 3901—a polyether (polyoxyalkylene) polyol 10 based on glycerine, having a hydroxyl number of about 28. It is sold by Mobay Chemical Company.

9151—another polyether polyol, having a hydroxyl number of about 28, which is sold by Mobay Chemical Company.

Voranol 3140 - a polyether polyol having a hydroxyl number of 44. It is sold by Dow Chemical Company.

Niax 16-46 - a polyether polyol having a molecular weight of about 3500. It is sold by Union Carbide Corp.

Stabilizers

L-5307—a polyethylene oxide methylsiloxane copolymer. It is sold by Union Carbide Corp.

L-560—a polyether silicone surfactant, sold by Union Carbide Corp.

Co-catalysts

Niax A-1-bis (2-dimethylamino ethyl) ether (70%) in dipropylene glycol (30%). It is sold by Union Carbide Corp.

Dabco 33LV—triethylenediamine (33%) in dipropylene glycol (67%). It is sold by Air Products and Chemicals, Inc.

C-232—a tertiary amine catalyst comprising a blend of parts bis (2-dimethylaminoethyl) ether 70% in dipropylene glycol part diethylene-triamine 33% in propylene glycol 67%.

Catalysts

C-4—a tin catalyst comprising stannous octoate diluted with an equal amount of di(2-ethylhexyl) phthalate. It is sold by Witco Chemical Corporation.

UL-5—dibutyl tin dilaurate (50%) in di(2-ethylhexyl phthalate) (50%). It is sold by Witco Chemical Corporation.

S-10—a tin catalyst comprising 100% stannous octoate. by Cosan Chemical Co.

S-50—a tin catalyst comprising 50% stannous octoate in a phthalate plasticizer. It is sold by Cosan Chemical Co.

Additives

DEOA - diethanolamine (85%), water (15%). Commercially available from, e.g., Union Carbide Corp.

DEOA:$CO_2$—a salt composed of approximately 0.5 mole $CO_2$ per mole of DEOA.

DEOA:$CO_2$.$H_2O$—a complex of approximately 2DEOA:$2H_2O$:$1CO_2$ (i.e., 72.4% DEOA, 15.2% $CO_2$, and 12.4% $H_2O$ by Jeffamine D-2000—a 2000-molecular-weight difunctional polyether polyol containing primary amino end groups. It is sold D-2000:$CO_2$—a salt composed of approximately 1 to 1.2 moles $CO_2$ per mole of D-2000.

Jeffamine T-403—a 403-molecular-weight trifunctional polyether polyol containing primary amino end groups. It is sold by Texaco.

T-403:$CO_2$—a salt composed of approximately 1 to 1.2 moles $CO_2$ per mole of T-403.

Jeffamine D-230—a 230-molecular-weight difunctional polyether polyol containing primary amino end groups. It is sold 10 by Texaco.

D-230:$CO_2$—a salt composed of approximately 1 to 1.2 moles $CO_2$ per mole of D-230.

D-230:$CO_2$ (60/40)—D-230:$CO_2$ (60%) in water (40%).

D-230:$CO_2$ (66/34)—D-230:$CO_2$ (66.45%) in water (33.55%).

AMP-95—2-amino-2-methyl-l-propanol (95%) in water (5%). It is sold by Angus Chemical Company.

AMP-95:$CO_2$—a salt composed of approximately 0.4 mole $CO_2$ per mole of AMP-95.

TrisAmino - tris(hydroxymethyl)aminomethane, sold by Angus Chemical Company.

TrisAmino:$CO_2$—a salt composed of approximately 0.4 mole $CO_2$ per mole of TrisAmino.

Properties

Cream Time is the time interval from the pouring of the first liquid material until that material turns creamy or cloudy.

Rise Time is the time interval from the pouring of the liquid mixture into the mold until the completion of expansion of the foaming mass. Complete expansion is indicated by the cessation of rise, the solidification of the foam, and/or the noticeable evolution of gas bubbles ("health bubbles") on the surface of the foam.

The units of density are pounds per cubic foot ("pcf").

The CFD 25% data given are Compression Force Deflection measurements performed in accordance with ASTM D 3574-86 Test C. The units of CFD are psi.

The units of air permeability are cubic feet (of air) per minute (as measured by Test G of ASTM Method D 3574-86).

TABLE 1

| Formulation | A1 | A2 | B | C | D | E | F1 | F2 | F3 | G | H |
|---|---|---|---|---|---|---|---|---|---|---|---|
| M3901 | 70 | 70 | 70 | 70 | 70 | 70 | 70 | 70 | 70 | 70 | 70 |
| 9151 | 30 | 30 | 30 | 30 | 30 | 30 | 30 | 30 | 30 | 30 | 30 |
| TDI 80/20 | 56.3 | 56.3 | 56.3 | 56.3 | 56.3 | 56.3 | 68.6 | 68.6 | 68.6 | 68.6 | 68.6 |
| Index | 108 | 108 | 108 | 108 | 108 | 108 | 108 | 108 | 108 | 108 | 108 |
| L-5307 | 1.2 | — | — | — | — | — | — | — | — | — | — |
| $H_2O$ | 3.5 | 3.5 | 3.5 | 2.1 | 3.5 | 2.1 | 4.5 | 4.5 | 4.5 | 4.5 | 2.4 |
| DEOA | 3.5 | 3.5 | — | — | — | — | 4.0 | 4.0 | 4.0 | — | — |
| UL-5/M3901 1:4 | .15 | — | — | — | — | — | — | — | — | — | — |
| C-4 | — | .05 | .05 | .05 | .05 | .05 | .05 | .15 | .15 | .15 | .15 |
| A-1/33LV 3:1 | .25 | — | — | — | — | — | — | — | — | — | — |
| L-560 | — | .75 | .75 | .75 | .75 | .75 | .75 | .85 | 1.1 | 1.1 | 1.1 |
| 33LV | — | .15 | .15 | .15 | .15 | .15 | .15 | .15 | .15 | .15 | .15 |
| A-1/33LV 1:3 | — | — | — | — | — | — | — | — | — | — | — |
| $DEOA:CO_2$ | — | — | — | 5.6 | 4.0 | — | — | — | — | 4.6 | — |
| $DEOA:CO_2:H_2O$ | — | — | 4.0 | — | — | 5.6 | — | — | — | — | 6.4 |
| Cream Time (sec) | 2 | 3 | 1 | 1 | 2 | 1 | 3 | 3 | 2 | 1 | 1 |
| Rise Time (sec) | 45 | 170 | 120 | 300 | 125 | 120 | 97 | 100 | 105 | 90 | 100 |
| Density | * | 1.47 | 1.28 | * | 1.41 | 1.42 | * | 1.38 | 1.30 | 1.22 | 1.24 |
| Air Perm | * | .3 | .4 | * | .6 | .55 | * | .45 | .40 | .35 | .30 |

*Unstable foam; no physical property data obtained.

TABLE 2

| Formulation | A | B | C | D |
|---|---|---|---|---|
| M3901 | 80 | 80 | 80 | 80 |
| 9151 | 20 | 20 | 20 | 20 |
| TDI 80/20 | 50.63 | 50.63 | 44.25 | 44.25 |
| Index | 108 | 108 | 105 | 105 |
| L-5307 | 1.25 | 1.25 | 0.75 | 0.75 |
| $H_2O$ | 3.2 | 3.2 | 2.55 | 2.55 |
| UL-5/M3901 1:4 | 0.6 | 0.3 | 0.23 | 0.23 |
| C-232/M3901 1:4 | 0.6 | 0.6 | 0.5 | 0.5 |
| DEOA | 4.0 | — | 4.0 | — |
| $DEOA:CO_2$ | — | 4.47 | — | 4.5 |
| Density | 1.42 | 1.35 | 1.82 | 1.69 |
| Air Perm | 2.3 | 1.8 | 1.9 | 2.3 |
| CFD 25% | 0.15 | 0.12 | 0.25 | 0.18 |

TABLE 3

| Formulation | A | B | C | D |
|---|---|---|---|---|
| 3140 | 100 | 80 | 80 | 80 |
| TDI 80/20 | 50.8 | 51.7 | 51.7 | 51.7 |
| Index | 105 | 105 | 105 | 105 |
| $H_2O$ | 4.3 | 4.3 | 4.3 | 4.3 |
| L-560 | 1.4 | 1.2 | 1.4 | 1.4 |
| A-1/33LV 3:1 | .5 | .05 | .5 | .5 |
| S-10 | .3 | — | .15 | .15 |
| D-2000 | — | 20 | 20 | — |
| $D-2000:CO_2$ | — | — | — | 20 |
| Cream Time (sec) | 1 | 3 | 1 | 1 |
| Rise Time (sec) | 47 | 115 | 40 | 45 |
| Density | 1.30 | * | 1.41 | 1.35 |
| CFD 25% | 0.25 | * | 0.43 | 0.38 |
| Air Perm | 3.40 | * | <.20 | 0.40 |

*Unstable foam; no physical property data obtained.

TABLE 4

| Formulation | A | B | C | D | E | F | G | H | I |
|---|---|---|---|---|---|---|---|---|---|
| 3140 | 100 | 100 | 100 | 100 | 100 | 100 | 100 | 100 | 100 |
| TDI 80/20 | 50.8 | 52.7 | 52.7 | 52.7 | 51.6 | 52.0 | 52.0 | 52.0 | 51.6 |
| Index | 105 | 105 | 105 | 105 | 105 | 105 | 105 | 105 | 105 |
| $H_2O$ | 4.3 | 4.3 | 4.3 | 4.3 | 4.3 | 4.3 | 4.3 | 3.1 | 3.7 |
| L-560 | 1.4 | 1.4 | 1.4 | 1.1 | 1.2 | 1.0 | 1.2 | 1.2 | 1.2 |
| A-1/33LV 3:1 | .5 | .5 | .35 | .35 | .35 | .35 | .35 | .35 | .35 |
| S-10 | .3 | .3 | .15 | — | .05 | .025 | .05 | .05 | .05 |
| T-403 | — | 3.0 | 3.0 | 3.0 | 1.0 | 2.0 | 2.0 | — | — |
| $T-403:CO_2$ | — | — | — | — | — | — | — | 3.8 | 1.9 |
| Cream Time (sec) | 1 | 1 | 1 | 1 | 1 | 1 | 1 | 2 | 2 |
| Rise Time (sec) | 45 | 55 | 70 | 70 | 73 | 65 | 59 | 105 | 100 |
| Density | 1.42 | * | * | * | 1.49 | * | 1.43 | 1.37 | 1.63 |
| CFD 25% | 0.43 | * | * | * | 0.24 | * | 0.25 | 0.18 | 0.22 |
| Air Perm | 0.20 | * | * | * | 3.80 | * | 4.80 | 3.40 | 1.80 |

*Unstable foam; no physical property data obtained.

TABLE 5

| Formulation | A | B | C | D | E | F | G |
|---|---|---|---|---|---|---|---|
| 3140 | 100 | 100 | 100 | 100 | 100 | 100 | 100 |
| TDI 80/20 | 68.8 | 69.4 | 69.4 | 70.8 | 70.8 | 72.1 | 72.1 |
| Index | 105 | 105 | 105 | 105 | 105 | 105 | 105 |
| $H_2O$ | 6.0 | 6.0 | 5.0 | 6.0 | 3.1 | 6.0 | 1.1 |
| L-560 | 1.4 | 1.2 | 1.3 | 1.3 | 1.3 | 1.8 | 1.3 |
| A-1/33LV 3:1 | .5 | .4 | .4 | .4 | .4 | .4 | .4 |
| S-10 | .3 | .2 | .25 | .175 | .25 | .1 | .3 |
| T-403 | — | 1.0 | — | 3.0 | — | 5.0 | — |

TABLE 5-continued

| Formulation | A | B | C | D | E | F | G |
|---|---|---|---|---|---|---|---|
| T-403:$CO_2$ | — | — | 2.2 | — | 6.65 | — | 11.1 |
| Cream Time (sec) | 2 | 2 | 2 | 2 | 1 | 1 | 1 |
| Rise Time (sec) | 36 | 37 | 38 | 45 | 37 | 32 | 43 |
| Density | 1.31 | 1.02 | 1.11 | 1.17 | 1.16 | 1.15 | 1.16 |
| CFD 25% | 0.44 | 0.36 | 0.44 | 0.30 | 0.39 | 0.28 | 0.37 |
| Air perm | 1.70 | <.20 | <.20 | <.20 | 0.55 | <.20 | 0.45 |

TABLE 6

| Formulation | A | B | C | D | E | F | G |
|---|---|---|---|---|---|---|---|
| 3140 | 100 | 100 | 100 | 100 | 100 | 100 | 100 |
| TDI 80/20 | 68.8 | 69.6 | 69.6 | 71.4 | 71.4 | 73.2 | 73.2 |
| Index | 105 | 105 | 105 | 105 | 105 | 105 | 105 |
| $H_2O$ | 6.0 | 6.0 | 5.2 | 6.0 | 3.65 | 6.0 | 2.1 |
| L-560 | 1.4 | 1.4 | 1.4 | 1.5 | 1.55 | 1.5 | 1.5 |
| A-1/33LV 3:1 | .5 | .3 | .3 | .2 | .2 | .2 | .2 |
| S-10 | .3 | .2 | .25 | .175 | .25 | .2 | .25 |
| D-230 | — | 1.0 | — | 3.0 | — | 5.0 | — |
| D-230:$CO_2$ | — | — | 2.05 | — | 6.1 | — | 10.2 |
| Cream Time (sec) | 2 | 2 | 2 | 2 | 2 | 2 | 2 |
| Rise Time (sec) | 35 | 52 | 65 | 63 | 89 | 51 | 95 |
| Density | 1.05 | 1.13 | 1.16 | 1.12 | 1.07 | 1.08 | .98 |
| CFD 25% | 0.39 | 0.40 | 0.45 | 0.30 | 0.33 | 0.19 | 0.21 |
| Air Perm | <.20 | 0.25 | <.20 | 0.70 | <.20 | 0.30 | 0.25 |

TABLE 7

| Formulation | A | B | C |
|---|---|---|---|
| 3140 | 100 | 95 | 100 |
| TDI 80/20 | 68.8 | 73.2 | 73.2 |
| Index | 105 | 105 | 105 |
| L-560 | 1.5 | 2.5 | 1.8 |
| S-50 | .25 | .15 | .15 |
| $H_2O$ | 6.0 | 6.0 | 2.65 |
| C-232/3140 1:4 | 1.25 | .35 | 1.0 |
| D-230/3140 1:1 | — | 10.0 | — |
| D-230:$CO_2$ (66/34) | — | — | 10.0 |
| Rise Time (sec) | 70 | 60 | 105 |
| Density | 1.07 | 1.07 | 1.00 |
| CFD 25% | 0.33 | 0.33 | 0.24 |
| Air Perm | 6.5 | 0.4 | 3.6 |

TABLE 8

| Formulation | A | B | C | D | E | F | G |
|---|---|---|---|---|---|---|---|
| 16-46 | 100 | 99 | 97 | 95 | 92.5 | 95 | 92.5 |
| TDI 80/20 | 63 | 64 | 65 | 67 | 69 | 67 | 69 |
| Index | 105 | 105 | 105 | 105 | 105 | 105 | 105 |
| L-560 | 1.5 | 1.5 | 1.5 | 1.5 | 1.5 | 1.5 | 1.5 |
| S-50 | .25 | .25 | .25 | .25 | .25 | .35 | .40 |
| A-1/33LV 3:1 | .25 | .20 | .20 | .20 | .20 | .25 | .20 |
| $H_2O$ | 5.5 | 4.9 | 3.8 | 2.65 | 1.2 | 2.65 | 1.2 |
| D-230:$CO_2$ (60/40) | — | 1.8 | 5.3 | 8.9 | 13.3 | 8.9 | 13.3 |
| Cream Time (sec) | 12 | 14 | 12 | 10 | 8 | 7 | 6 |
| Rise Time (sec) | 73 | 91 | 130 | 127 | 119 | 107 | 105 |
| Density | 1.26 | 1.21 | 1.42 | * | * | 1.25 | 1.05 |
| CFD 25% | 0.38 | 0.42 | 0.46 | * | * | 0.39 | 0.28 |
| Air Perm | 3.8 | 2.8 | 0.6 | * | * | 0.2 | 0.15 |

*Unstable foam; no physical property data obtained.

TABLE 9

| Formulation | A | B | C | D | E | F | G | H |
|---|---|---|---|---|---|---|---|---|
| 3140 | 100 | 100 | 100 | 100 | 100 | 100 | 100 | 100 |
| TDI 80/20 | 68.8 | 70.8 | 70.8 | 74.9 | 74.9 | 89.1 | 89.1 | 78.9 |
| Index | 105 | 105 | 105 | 105 | 105 | 105 | 105 | 105 |
| $H_2O$ | 6.0 | 5.95 | 4.65 | 5.95 | 1.85 | 6.95 | 0.15 | 7.0 |
| L-560 | 1.4 | 1.4 | 1.4 | .8 | .8 | 1.7 | 1.4 | 1.7 |
| A-1/33LV 3:1 | .5 | .1 | .2 | — | — | — | — | .4 |
| S-10 | .3 | .3 | .3 | .1 | .2 | .2 | .2 | .35 |
| AMP-95 | — | 1.0 | — | 3.0 | — | 5.0 | — | — |
| AMP-95:$CO_2$ | — | — | 2.7 | — | 8.0 | — | 13.4 | — |
| Cream Time (sec) | 2 | 3 | 3 | 2 | 3 | 2 | 3 | 2 |
| Rise Time (sec) | 52 | 107 | 97 | 77 | 147 | 65 | 106 | 51 |
| Density | 1.19 | 1.11 | 1.11 | 0.98 | 1.02 | 0.98 | 0.85 | 0.87 |
| CFD 25% | 0.35 | 0.27 | 0.26 | 0.27 | 0.34 | 0.31 | 0.39 | 0.28 |
| Air Perm | 1.50 | 0.45 | 0.65 | <20 | <.20 | <.20 | <.20 | <.20 |

TABLE 10

| Formulation | A | B | C | D | E | F | G | H |
| --- | --- | --- | --- | --- | --- | --- | --- | --- |
| 3140 | 100 | 100 | 100 | 100 | 100 | 100 | 100 | 100 |
| TDI 80/20 | 68.8 | 71.8 | 71.8 | 74.8 | 74.8 | 87.0 | 94.4 | 94.4 |
| Index | 105 | 105 | 105 | 105 | 105 | 105 | 105 | 105 |
| $H_2O$ | 6.0 | 6.0 | 4.05 | 6.0 | 2.1 | 7.8 | 7.8 | — |
| L-560 | 1.4 | 1.4 | 1.4 | 1.5 | 1.5 | 2.5 | 2.5 | 2.5 |
| A-1/33LV 3:1 | .5 | .1 | .1 | .2 | .2 | .3 | .3 | .3 |
| S-10 | .3 | .2 | .2 | .2 | .2 | .5 | .4 | .4 |
| TrisAmino | — | 1.0 | — | 2.0 | — | — | 4.0 | — |
| TrisAmino:$CO_2$ | — | — | 3.2 | — | 6.4 | — | — | 12.8 |
| Cream Time (sec) | 2 | 3 | 3 | 2 | 2 | 2 | 2 | 2 |
| Rise Time (sec) | 32 | 105 | 141 | 50 | 122 | 53 | 67 | 75 |
| Density | 1.40 | 1.22 | 1.14 | 1.16 | 1.09 | 0.92 | 0.85 | 0.87 |
| CFD 25% | 0.35 | 0.58 | 0.46 | 0.55 | 0.34 | 0.45 | 0.28 | 0.21 |
| Air Perm | 0.50 | <.20 | 0.50 | 0.60 | 0.40 | <.20 | <.20 | 0.70 |

What is claimed is:

1. An improved flexible, open-celled polyurethane foam produced in situ from the reaction, in the presence of a catalyst, of an isocyanate, a blowing agent, a foam stabilizer, a polyether polyol having a molecular weight from about 2000 to about 6500, and a liquid salt produced from the reaction of $CO_2$ with a water-soluble amine or amino alcohol, wherein the liquid salt is present in an amount greater than or equal to about 2 parts by weight per 100 parts by weight of polyol, the foam being characterized by reduced density as compared with a second foam of the same composition that was produced from a reaction mixture wherein the liquid salt was present in an amount less than about 2 parts by weight per 100 parts by weight of polyol.

2. The foam of claim 1 wherein the isocyanate is tolylene diisocyanate.

3. The foam of claim 1 wherein the liquid salt is the product of the reaction of $CO_2$ with a secondary amine which contains a primary hydroxyl group.

4. The foam of claim 3 wherein the secondary amine contains at least as many hydroxyl groups as amino groups.

5. The foam of claim 5 wherein the secondary amine is diethanolamine.

6. The foam of claim 5 wherein the liquid salt is a stable complex consisting of diethanolamine, water, and approximately 15% $CO_2$ by weight.

7. The foam of claim 3 wherein the liquid salt is present in an amount greater than or equal to about 4 parts by weight per 100 parts by weight of polyol.

8. The foam of claim 7 wherein the density is at least 10% lower than that of a second foam of the same composition that was produced from a reaction mixture wherein the liquid salt was present in an amount less than about 2 parts by weight per 100 parts by weight of polyol.

9. The foam of claim 7 wherein the isocyanate is tolylene diisocyanate.

10. The foam of claim 1 wherein the liquid salt is the product of the reaction of $CO_2$ with a primary amine and is present in an amount greater than or equal to about 3 parts by weight per 100 parts by weight of polyol.

11. The foam of claim 10 wherein the primary amine is a polyol which contains primary amino end groups.

12. The foam of claim 11 wherein the primary amine is a polyether polyol in which substantially all of the hydroxyl groups have been converted to amino groups.

13. The foam of claim 12 wherein the polyether polyol is a difunctional product with a molecular weight less than or equal to about 230.

14. The foam of claim 10 wherein the liquid salt is present in an amount greater than or equal to about 6 parts by weight per 100 parts by weight of polyol.

15. The foam of claim 14 wherein the density is at least 10% lower than that of a second foam of the same composition that was produced from a reaction mixture wherein the liquid salt was present in an amount less than about 2 parts by weight per 100 parts by weight of polyol.

16. The foam of claim 14 wherein the isocyanate is tolylene diisocyanate.

17. The foam of claim 1 wherein the liquid salt is the product of the reaction of $CO_2$ with a low molecular weight aminohydroxy compound and is present in an amount greater than or equal to about 3 parts by weight per 100 parts by weight of polyol.

18. The foam of claim 17 wherein the low molecular weight aminohydroxy compound is selected from the group consisting of tris(hydroxymethyl)aminomethane, 2-amino-2-methyl-1-propanol, and mixtures thereof.

19. The foam of claim 17 wherein the liquid salt is present in an amount greater than or equal to about 6 parts by weight per 100 parts by weight of polyol.

20. The foam of claim 19 wherein the density is at least 10% lower than that of a second foam of the same composition that was produced from a reaction mixture wherein the liquid salt was present in an amount less than about 2 parts by weight per 100 parts by weight of polyol.

21. The foam of claim 19 wherein the isocyanate is tolylene diisocyanate.

22. In the method for the continuous manufacture of flexible, open-celled polyurethane foam from the reaction, in the presence of a catalyst, of a formulation comprising an isocyanate, a blowing agent, a foam stabilizer, and a polyether polyol having a molecular weight from about 2000 to about 6500, the improvement which comprises:

adding to the formulation a liquid salt produced from the reaction of $CO_2$ with a water-soluble amine or amino alcohol, wherein the liquid salt is added to the formulation in an amount greater than or equal to about 2 parts by weight per 100 parts by weight of polyol, so that the foam product is characterized by a reduced density as compared with a second foam of the same composition that was produced from a reaction mixture wherein the liquid salt was added in an amount less than about 2 parts by weight of polyol.

23. The method of claim 22 wherein the isocyanate is tolylene diisocyanate.

24. The method of claim 22 wherein the liquid salt is the product of the reaction of $CO_2$ with a secondary amine which contains a primary hydroxyl group.

25. The method of claim 24 wherein the secondary amine contains at least as many hydroxyl groups as amino groups.

26. The method of claim 25 wherein the secondary amine is diethanolamine.

27. The method of claim 26 wherein the liquid salt is a stable complex consisting of diethanolamine, water, and approximately 15% $CO_2$ by weight.

28. The method of claim 24 wherein the liquid salt is added in an amount greater than or equal to about 4 parts by weight per 100 parts by weight of polyol.

29. The method of claim 28 which produces a foam with a density at least 10% lower than that of a second foam of the same composition that was produced from a reaction mixture wherein the liquid salt was added in an amount less than about 2 parts by weight per 100 parts by weight of polyol.

30. The method of claim 28 wherein the isocyanate is tolylene diisocyanate.

31. The method of claim 22 wherein the liquid salt is the product of the reaction of $CO_2$ with a primary amine and is added in an amount greater than or equal to about 3 parts by weight per 100 parts by weight of polyol.

32. The method of claim 31 wherein the primary amine is a polyol which contains primary amino end groups.

33. The method of claim 32 wherein the primary amine is a polyether polyol in which substantially all of the hydroxyl groups have been converted to amino groups.

34. The method of claim 33 wherein the polyether polyol is a difunctional product with a molecular weight less than or equal to about 230.

35. The method of claim 31 wherein the liquid salt is added in an amount greater than or equal to about 6 parts by weight per 100 parts by weight of polyol.

36. The method of claim 35 which produces a foam with a density at least 10% lower than that of a second foam of the same composition that was produced from a reaction mixture wherein the liquid salt was added in an amount less than about 2 parts by weight per 100 parts by weight of polyol.

37. The method of claim 35 wherein the isocyanate is tolylene diisocyanate.

38. The method of claim 22 wherein the liquid salt is the product of the reaction of $CO_2$ with a low molecular weight aminohydroxy compound and is added in an amount greater than or equal to about 3 parts by weight per 100 parts by weight of polyol.

39. The method of claim 38 wherein the low molecular weight aminohydroxy compound is selected from the group consisting of tris(hydroxymethyl)aminomethane, 2-amino-2-methyl-1-propanol and mixtures thereof.

40. The method of claim 38 wherein the liquid salt is added in an amount greater than or equal to about 6 parts by weight per 100 parts by weight of polyol.

41. The method of claim 40 which produces a foam of the same composition that was produced from a reaction mixture wherein the liquid salt was added in an amount less than about 2 parts by weight per 100 parts by weight of polyol.

42. The method of claim 40 wherein the isocyanate is tolylene diisocyanate.

* * * * *

UNITED STATES PATENT AND TRADEMARK OFFICE
CERTIFICATE OF CORRECTION

PATENT NO. : 5,006,569

DATED : Apr. 9, 1991

INVENTOR(S) : Herman Stone

It is certified that error appears in the above-identified patent and that said Letters Patent is hereby corrected as shown below:

Column 3, line 20, change "the 10 reduction of water" to --the reduction of water--.

Column 5, line 36, change "2DEOA:2H$_2$O 1-CO$_2$" to --2DEOA:2H$_2$O:1CO$_2$--.

Column 6, line 37, change "diphenyl-4,4,-diisocyanate" to --diphenyl-4,4'-diisocyanate--.

Column 7, line 3, change "N,N,N,,N," to --N,N,N',N'--.

Column 7, line 3, change "tetramethyl-1,3butanediamine" to --tetramethyl-1,3-butanediamine--.

Column 7, line 5, change "(N,N,-diethanolamine)" to --(N,N'-diethanolamine)--.

Column 7, line 11, change "(N,N,-diethanolamine)" to --(N,N'-diethanolamine)--.

UNITED STATES PATENT AND TRADEMARK OFFICE
CERTIFICATE OF CORRECTION

PATENT NO. : 5,006,569
DATED : Apr. 9, 1991
INVENTOR(S) : Herman Stone It is certified that error appears in the above-identified patent and that said Letters Patent is hereby corrected as shown below:

Column 7, line 48, change "polyol 10 based" to --polyol based--.

Column 8, line 5, change "of parts" to --of 3 parts--.

Column 8, line 6, change "glycol part" to --glycol 30% and 1 part--.

Column 8, line 17, change "stannous octoate by Cosan Chemical" to --stannous octoate. It is sold by Cosan Chemical--.

Column 8, line 29, change "$H_2O$ by Jeffamine D-2000" to --$H_2O$ by weight).--; "Jeffamine D-2000" should begin a new paragraph.

Column 8, line 31, change "It is sold" to --It is sold by Texaco.--.

Column 8, line 41, change "It is sold 10 by Texaco" to --It is sold by Texaco--.

UNITED STATES PATENT AND TRADEMARK OFFICE
CERTIFICATE OF CORRECTION

PATENT NO. : 5,006,569

DATED : Apr. 9, 1991

INVENTOR(S) : Herman Stone

It is certified that error appears in the above-identified patent and that said Letters Patent is hereby corrected as shown below:

Columns 9 and 10, Table 1, Row "A-1/33LV 1:3," the entry in Column H should be --____--.

Column 10, Table 3 should be labeled.

Column 13, Claim 5, should depend from Claim 4.

Column 14, Claim 22, line 61, change "foam product" to --foam produced--.

UNITED STATES PATENT AND TRADEMARK OFFICE
CERTIFICATE OF CORRECTION

PATENT NO. : 5,006,569

DATED : Apr. 9, 1991

INVENTOR(S) : Herman Stone

It is certified that error appears in the above-identified patent and that said Letters Patent is hereby corrected as shown below:

Column 16, Claim 41, lines 28-29, change "foam of the same composition" to --foam with a density at least 10% lower than that of a second foam of the same composition--.

Signed and Sealed this

Twenty-fourth Day of December, 1991

*Attest:*

HARRY F. MANBECK, JR.

*Attesting Officer*   *Commissioner of Patents and Trademarks*